(12) United States Patent
Dodge, III

(10) Patent No.: US 9,174,565 B2
(45) Date of Patent: Nov. 3, 2015

(54) RECYCLABLE RUBBER SECUREMENT MAT WITH SELF-PROVIDED INCLINE STOP

(71) Applicant: ECORE International Inc., Lancaster, PA (US)

(72) Inventor: Arthur B. Dodge, III, Lancaster, PA (US)

(73) Assignee: ECORE INTERNATIONAL INC., Lancaster, PA (US)

(*) Notice: Subject to any disclaimer, the term of this patent is extended or adjusted under 35 U.S.C. 154(b) by 0 days.

(21) Appl. No.: 14/310,842

(22) Filed: Jun. 20, 2014

(65) Prior Publication Data

US 2014/0377029 A1 Dec. 25, 2014

Related U.S. Application Data

(60) Provisional application No. 61/838,136, filed on Jun. 21, 2013.

(51) Int. Cl.
*B60P 7/08* (2006.01)

(52) U.S. Cl.
CPC .......... *B60P 7/0884* (2013.01); *Y10T 29/49826* (2015.01)

(58) Field of Classification Search
CPC ...... B61D 45/00; B61D 17/10; B61D 45/001; B61D 45/008; B61D 17/046; B61D 39/00; B61D 3/00; B61D 3/02; B61D 3/04; B61D 3/16; B61D 45/006; B61D 45/007; B61D 7/16; B62D 25/2054; B62D 33/023; B62D 33/08; B62D 53/08; B62D 63/061; B03B 5/32; B25G 1/005; B60D 1/015; B60D 1/488; B60J 5/125; B62B 1/206; B63J 2002/125; B63J 2/12; B63J 3/02; B64F 5/0036; B64G 1/22; B64G 1/641; B65G 69/00; B66C 1/10
USPC .......... 410/156; 52/177, 782.1, 795.1, 309.1, 52/506.1, 578, 588.1; 156/498, 249, 269, 156/285, 361, 555, 72
See application file for complete search history.

(56) References Cited

U.S. PATENT DOCUMENTS

| | | | | | |
|---|---|---|---|---|---|
| 4,325,481 | A | * | 4/1982 | Kortye | 206/503 |
| 4,422,549 | A | * | 12/1983 | Werkheiser | 206/386 |
| 6,007,282 | A | * | 12/1999 | Mundt | 410/94 |
| 6,578,896 | B1 | * | 6/2003 | Peterson | 296/97.23 |
| RE41,945 | E | | 11/2010 | Downey | |
| 2006/0127647 | A1 | * | 6/2006 | Thrush | 428/172 |
| 2006/0165950 | A1 | * | 7/2006 | Dodge, III | 428/90 |

* cited by examiner

*Primary Examiner* — Glenn Dayoan
*Assistant Examiner* — Sunsurraye Westbrook
(74) *Attorney, Agent, or Firm* — Dentons US LLP

(57) ABSTRACT

The present invention provides a securement mat for mitigating the migration of loads within a shipping vessel. The securement mat having a length, a width, and a height, and including a first subsection and a second subsection, wherein an area of the second subsection is less than an area of the first subsection. The securement mat has a first fold boundary along the length or width of the sheet and proximate to one edge of the sheet defining a boundary between the first and second subsection, wherein the first subsection exhibits a first incline by folding, along the first fold boundary, the second subsection underneath the first subsection.

18 Claims, 7 Drawing Sheets

RECYCLABLE RUBBER SECUREMENT MAT WITH SELF-PROVIDED INCLINE STOP

This application claims priority to U.S. Provisional App. No. 61/838,136, filed Jun. 21, 2013, which is incorporated herein by reference in its entirety for all purposes.

FIELD OF THE DISCLOSURE

The invention relates to a securement mat and method of installing said mat for protection of cargo in transit. More particularly, the invention relates to a securement mat with a self-provided incline stop. In preferred embodiments, the securement mat comprises recycled rubber.

BACKGROUND

Protection of cargo during shipment has always been a concern for the manufacturer of goods, the intended recipient of goods, and the shipper of said goods. Damage caused to cargo typically results in reduced worth for the product and, in the case of significant damage, total financial loss is possible. The manufacturer desires that its product reach its distributor or customer in the safest and cheapest way possible. Efficient, safe, and cheap shipping keeps the consumer price lower because the manufacturer is able to pass the lower shipping cost along to its customer. Damage to cargo typically arises from movement or shifting of the cargo during transit. Herein, shipment is typically by locomotive freight car ("boxcar") or, alternatively, by truck, airplane, marine vessels, and equivalents.

To keep cargo from shifting during transit (i.e., to secure the cargo), the accepted industry practice is to use wood blocking and bracing systems, semi-permanently affixing the blocking and bracing to at least the floor of the shipping vessel. This may cause damage to the structure of the shipping vessel and is a high-cost solution.

An alternative securement solution is to utilize securement mats underneath the cargo, in particular, rubber mats such as those manufactured by ECORE International of Lancaster, Pa., such as the TransMat™. The TransMat is designed to protect and cushion all types of cargo such as, but not limited to chemicals, beverages, roll paper, case and canned goods, which are susceptible to damage during transit. These rubber mats provide good stability, are low-cost, and reusable.

However, while these types of mats provide a high coefficient of friction between the mat and the cargo load and between the mat and the floor or lower surface of the shipping vessel, the cargo, when sufficiently jostled, can still move (i.e., shift within the shipping vessel). This movement can cause damage to both the cargo and the shipping vessel. Boxcar door and/or doorway damage has been one form of damage while using the less expensive rubber mat securement solution. But boxcar door/doorway damage is by no means the only type of damage that may occur.

One measure to protect the shipping vessel structures, is by securing the securement mat edge closest to the door/doorway with a piece of material (e.g., wood) as a doorway stop protection. However, a need exists for an improved securement mat that provides superior movement protection, but does not require extra labor steps to secure the mat.

SUMMARY

A securement mat is provided comprising a sheet of material, for example granulated recycled rubber, having a length, a width, and a height (or thickness). The sheet includes a first subsection comprising a main area and a boundary area. The sheet also includes at least one second subsection. The total area of the second subsection is less than the total area of the first subsection. The first subsection exhibits an incline area with a peak in the boundary area by folding the second subsection underneath the first subsection along a fold boundary.

A method for installing the securement mat involves folding the second subsection underneath the first subsection, along the fold boundary to form the incline area with a peak in the boundary area of the first subsection. The incline inhibits a load placed thereon from migrating in the direction of the incline. The method further may include positioning the securement mat over a surface of a shipping vessel with the edge including the fold boundary between the load and a structure (e.g., boxcar door) to be protected.

DETAILED DESCRIPTION

Figure 1A:
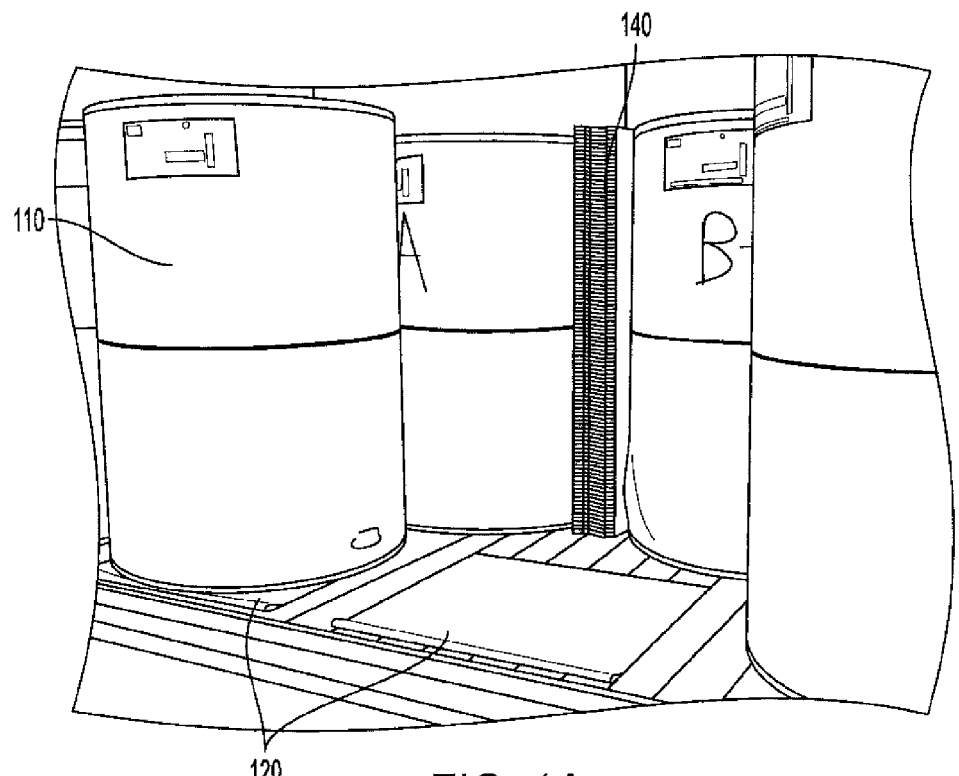
FIG. 1A shows a locomotive freight or boxcar with a plurality of cargo items.
Figure 1B:
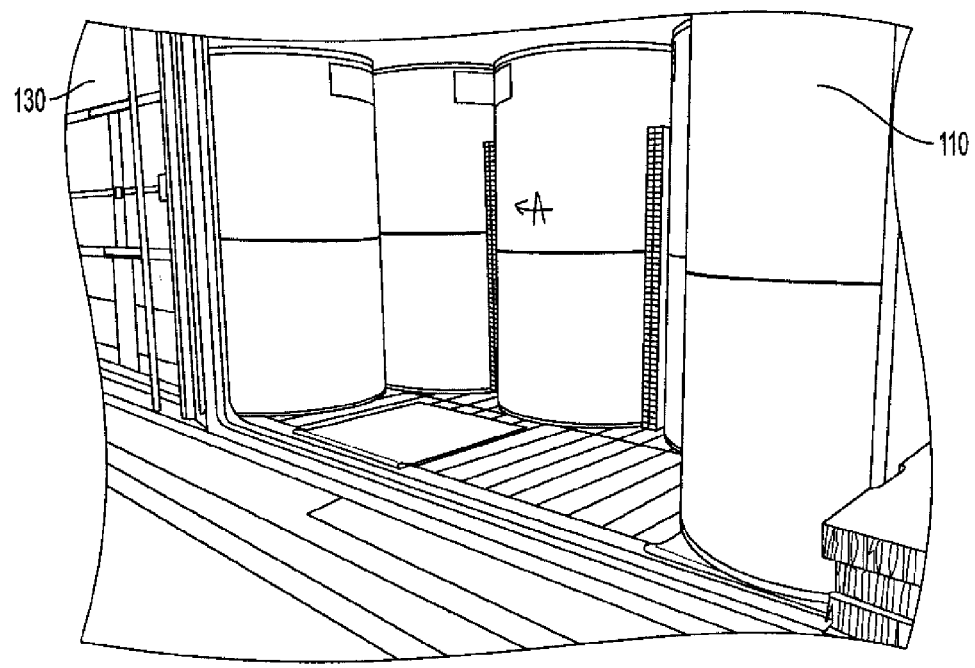
FIG. 1B shows a typical cargo shipping arrangement of roll papers held in place by an exemplary embodiment of the invention.

As shown in FIGS. 1A and 1B, cargo items 110 are packed as tightly as possible within shipping vessels (e.g. a locomotive boxcar 130) for efficiency and cost. However, this tight packing also results in improved safety (for the cargo, vessel, and any humans involved in the shipping) because the cargo has less space in which it can move (i.e., shift) during transit. One form of protection against damage to either the cargo or the shipping vessel is a securement mat, generally discussed above and detailed further below. In this regard, one or more securement mats 120 are placed under some or all of the cargo items 110. Other forms of protection, in addition to the securement mat, may be provided. For example, corrugated cardboard buffers 140 may be placed between the cargo items 110.

In the illustrated examples of FIGS. 1A and 1B, while there is concern over general damage to the boxcar, there is particular concern over damage to the boxcar door and/or doorway, such that the securement mats 120 may be placed only in those areas. However, it will be understood that the securement mats 120 can be placed elsewhere to protect other items or structures associated with the boxcars, such as the boxcar walls.

In FIGS. 1A and 1B, the cargo items 110 are industrial size rolls of paper. It should be understood, however, that the paper rolls are but one example of cargo and that the present invention is not limited to any type of cargo. These rolls are very heavy and if they shift and collide with the shipping vessel structure, significant damage can occur. Despite the weight of the cargo items 110, the items tend to migrate due to, for example, vibrations of the shipping vessel. If the vibrations are sufficient, cargo item 110 can effectively float above securement mat 120, migrate, and collide with other cargo items and shipping vessel structures, such as the boxcar 130 door.

To prevent or at least mitigate the aforementioned cargo item migration, the securement mat 120 is configured to exhibit an incline, along one or more of its edges, that provides buffer protection between the cargo 110 and a structure, e.g., the boxcar door.

More specific details regarding the composition, features, design, and function of the securement mat 120 will be described with respect to FIGS. 2A-C, 3A-B, and 4.

Figure 2A:
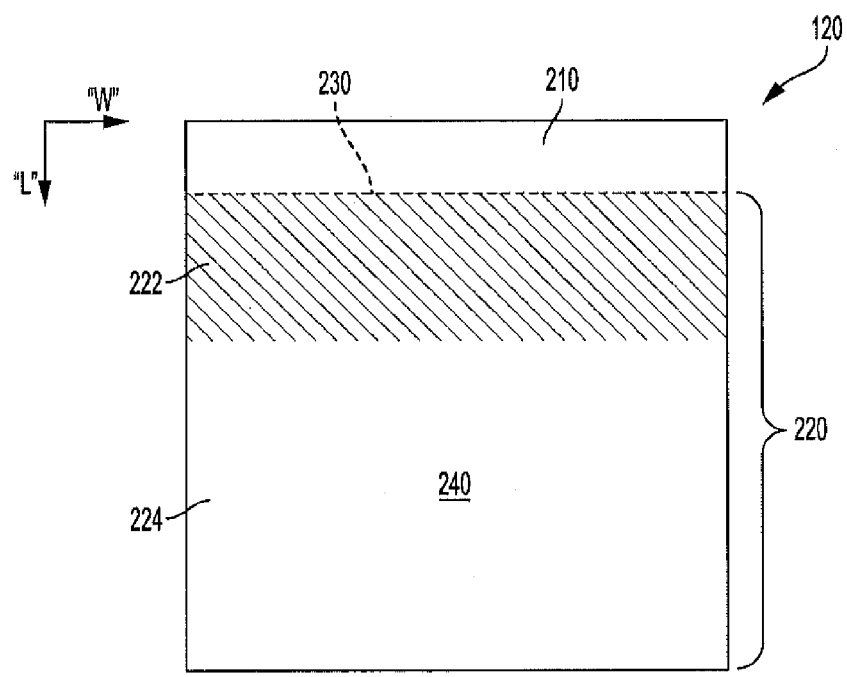
FIG. 2A illustrates dimensions of an exemplary embodiment of the invention.
Figure 2B:
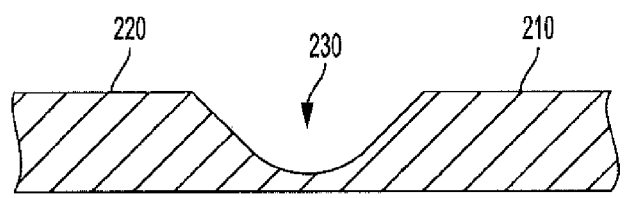
FIGS. 2B and 2C illustrate exemplary types of fold boundary cuts.

FIG. 2A illustrates an exemplary layout of a single securement mat 120 according to one embodiment of the invention. Securement mat 120 comprises a sheet of rubber or rubber-like material 240. It should be noted, that while the exemplary embodiment is described as comprising a sheet of rubber material, this should not be considered as limiting. It is contemplated that the securement mat 120 may comprise many other materials. Said rubber material 240 may be comprised of granulated recycled rubber material mixed with a binder and then shaped into sheet form. A specific example of a sheet of granulated rubber material 240 is the TransMat™ described above. U.S. Pat. No. RE41,945 generally discloses material that would be suitable for the securement mat 120, and is incorporated by reference herein in its entirety for all purposes.

Sheet 240 has a length ("L"), a width ("W"), and a height or thickness ("T"). The length of the sheet 240 can accommodate any range of product length; an exemplary length is 36-60 inches. The width of the sheet 240 can accommodate any range of product width; an exemplary width is 24-48 inches. The thickness of the sheet 240 can accommodate any range of product thickness; an exemplary thickness is 1-5 mm.

Figure 2C:
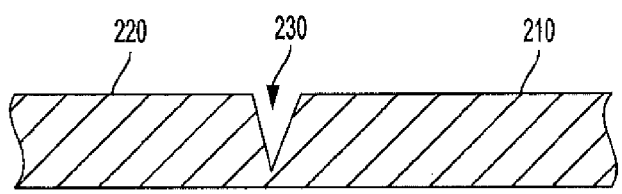

The sheet 240 is comprised of two sections: a first subsection 220 and a second subsection 210. The boundary between the first 220 and second 210 subsections is defined by a fold 230. Fold 230 comprises a reduction of material along a path to facilitate folding of the second subsection 210 underneath the first subsection 220. Examples of the reduction of material to form the fold 230 include the gradual thinning of the material as shown in the profile FIG. 2B, or a grove cut in the sheet 240 as shown in FIG. 2C. While these and similar types of fold lines are envisioned by this invention, the preferred embodiment is for the fold boundary to be comprised of a perforation. Herein a perforation is an organized plurality of individual perforations. With regard to the individual perforations, the invention contemplates individual perforations which penetrate the entire thickness of the sheet 240 and also individual perforations which do not penetrate all the way through the sheet 240.

The first subsection 220 further comprises to two areas: a boundary area 222 in close proximity to the fold boundary 230 and along the fold boundary 230, and a main area 224 comprising the remainder of the first subsection 220.

In one embodiment of the invention, the second subsection 210 shares two dimensions, for example width (W) and height (T), with the first subsection 220. But the length (L) of the second subsection 210 is significantly less than the length (L) of the first subsection 220, as can be seen in FIG. 2. As such, the surface area of the second subsection 210 is less that the surface area of the first subsection 220. Preferably, the length (L) of the second subsection 210 is 5-30% of the length of the first subsection 220. More preferably, the length (L) of the second subsection 210 is 10-20% of the length of the first subsection 220. And even more preferably, the length of the second subsection 210 is 10-12% of the length of the first subsection 220.

The fold boundary 230 defining the boundary between the first 220 and second 210 subsections is located near one edge of the sheet 240 and designed to allow for easy folding of the sheet of material 240 along the fold boundary 230, but resists ripping. The fold boundary 230 is designed such that the second subsection 210 will not detach from the first subsection 220 under typical operating conditions. In a preferred embodiment, the fold boundary 230 consists of a plurality of small slots arranged in a straight line across one entire dimension (e.g., width) of the sheet of granulated rubber material 240. The slots are preferably cut 100% through the sheet of material 240, but may be cut to a depth less than 100% thereby not fully penetrating the sheet 240. The ratio of the length of each slot to the length of material 240 between the slots is from 30%/70% to 90%/10%. More preferably, the ratio is from 70%/30% to 80%/20%. And even more preferably, the ratio is 75%/25%. This ratio is directly related to the tensile strength of the sheet material 240. If the sheet 240 has a higher tensile strength, the perforation ratio can be closer to 90%/10% than 30%/70%. As the tensile strength of the sheet material 240 is decreases the perforation ratio decreases.

Figure 3A:
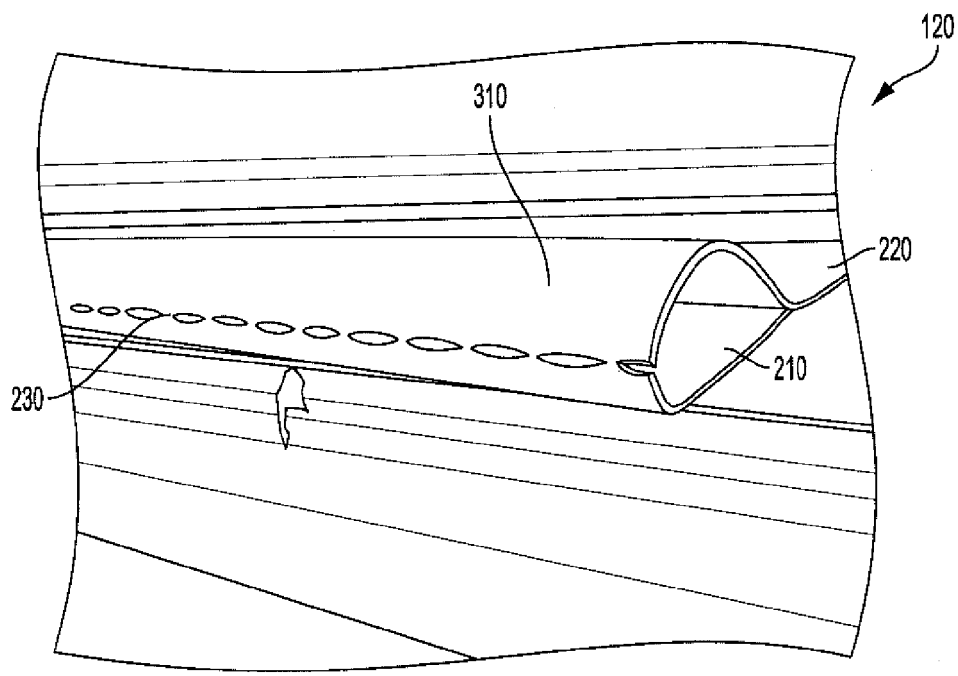
FIG. 3A is a perspective photograph of an exemplary embodiment of the invention.
Figure 4A:
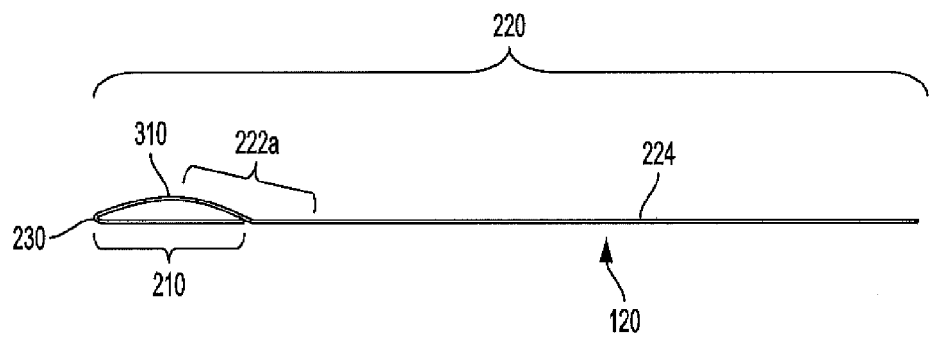
FIG. 4A is a side perspective of the embodiment in FIG. 3A.

As can be seen in FIGS. 3A and 4A, when the second subsection 210 is folded, along the fold boundary 230, underneath the first subsection 220, an area of the first subsection 220 proximate the fold boundary 230 exhibits an incline sloping upward away from the plane of the remainder of the first subsection 220 (i.e., the main area 224). The area 222a that exhibits the incline is within the area defined as the boundary area 222. The remainder of the first subsection 220, that is the portion which exhibits little or no incline or rise, is defined as the main area 224. Similar to the second subsection 210, the boundary area 222 shares two dimensions, for example width (W) and height (T), with the first subsection 220. But the length (L) of the boundary area 222 is less than the length (L) of the first subsection 220. As such, the surface area of the boundary area 222 is less that the surface area of the first subsection 220. Preferably, the length of the boundary area 222 is 5-40% of the length of the first subsection. More preferably, the length of the boundary area 222 is 10-20% of the length of the first subsection. And even more preferably, the length of the boundary area 222 is 10-12% of the length of the first subsection.

Figure 3B:
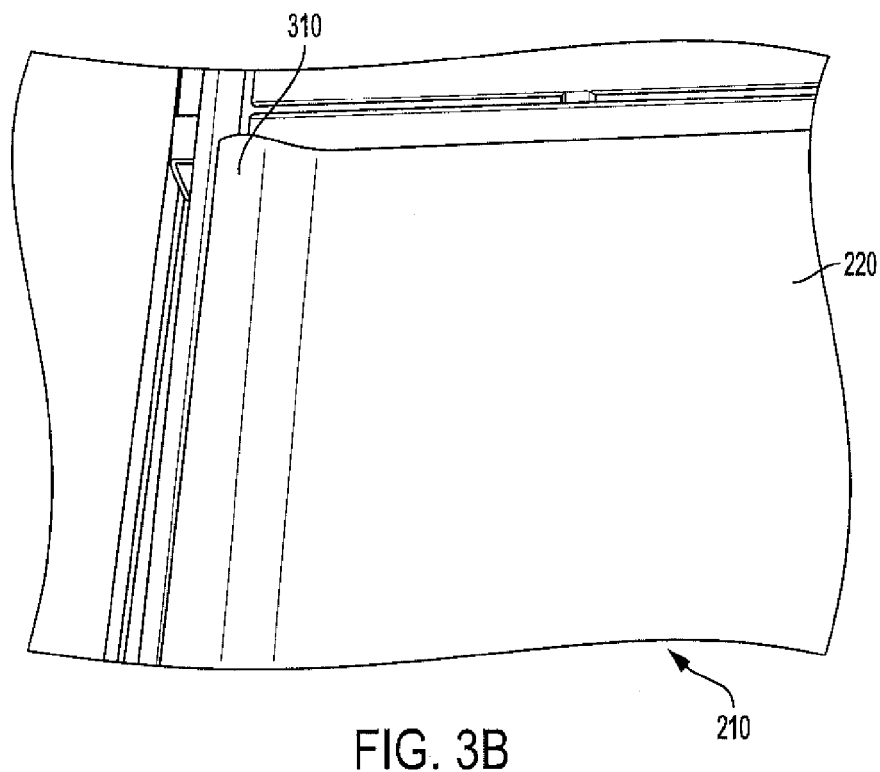
FIG. 3B illustrates the exemplary embodiment of FIG. 3A from a different perspective.

As can be seen in FIGS. 3A and 3B, and more specifically in FIG. 4, when the second subsection 210 is folded underneath the first subsection 220, the peak 310 (and thus the inclined area 222a) is formed in the boundary area 222 of the first subsection 210. The main area 224 of the first subsection 220 remains disposed in the same plane or substantially in the same plane as before the folding occurred (i.e., it remains flat with respect to the peak 310 and inclined area 222a). While not limited to such, the rise of peak 310 is typically between 1 and 4 times the thickness of the sheet 240. More typically, the peak 310 is around 2 times the thickness of the sheet 240. For example, a 2 mm thick sheet 240 wherein the second subsection 210 is folded underneath the first subsection 220 creates a 4 mm peak 310 in the boundary area 222. The rise of peak 310 with respect to the flat main area 224 defines the slope of inclined area 222a.

Figure 4B:
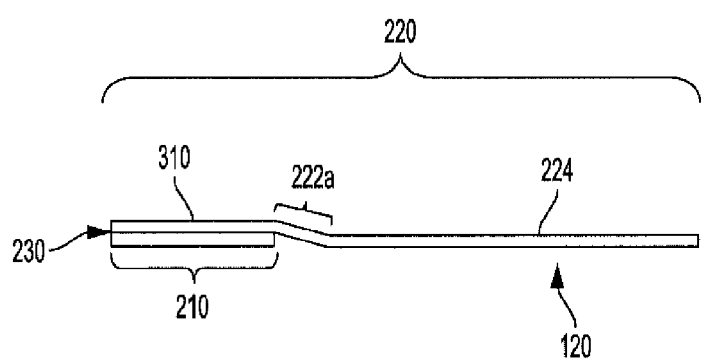
FIG. 4B is a side perspective of yet another embodiment of the invention.

In another embodiment shown in FIG. 4B, the fold boundary 230 is such that the second subsection 210 folds fully underneath the first subsection 220 such that the boundary area 222 lies flat on top of the folded second subsection 210. That is the peak 310 would not be at the apex of a "bow" in the boundary area, but would instead be located across the entire surface area, or substantially the entire surface area, of the boundary area 222 located above the folded underneath second subsection 210. Accordingly, the inclined area 222a, would be from the edge of this "double thick" section until the boundary area was flat on the surface (i.e., until the main area 224).

Figure 5:
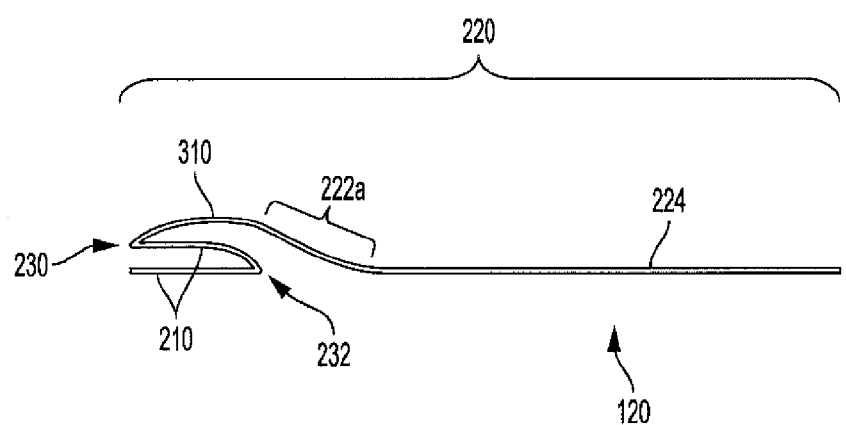
FIG. 5 is a side perspective of still another embodiment of the invention.

In another embodiment as shown in FIG. 5, should additional rise of peak 310 be desired, a second fold boundary 232 on the second subsection 210 may allow the second subsection 210 to be folded twice, such that the inclined area 222a has a peak 310 of at least 2× what a single fold would provide.

As described earlier, while the typical mass of a load (e.g., cargo 110) in conjunction with the inherently high coefficient of friction of sheet material 240 keeps the load fairly stationary, the load is capable of migrating from its initial position. Peak 310 creates a raised buffer (i.e., inclined area 222a) so that even if a load (cargo 110) migrates on the securement mat 120, the load will be stopped from migration in the direction of the peak 310. This allows for protection of structures located in the direction of the peak 310. That is, the folded-under second subsection 210 and subsequent incline in the inclined area 222a of boundary area 222 of the first subsection 220, should be placed between the load 110 and the structure to be protected from damage.

Figure 6A:
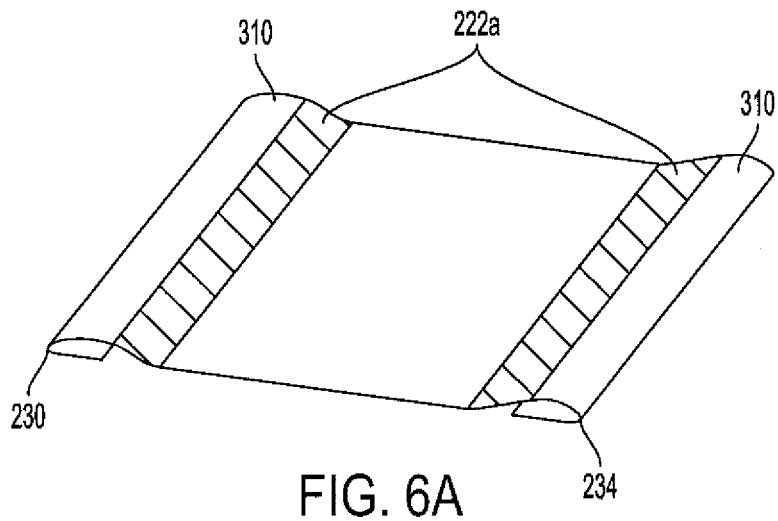
FIGS. 6A-6C are further illustrations showing three additional embodiments of the invention including more than one edge with an incline.

In another embodiment as shown in FIG. 6A, the sheet 240 may have at least one other fold boundary 234 disposed similar to fold boundary 230 described herein, but located on an opposite edge of the sheet 240. Such a configuration would similarly have two boundary areas and after folding two separate inclines on opposite ends of the sheet 240. Such a design would inhibit a load from migrating in two opposing directions.

Figure 6B:
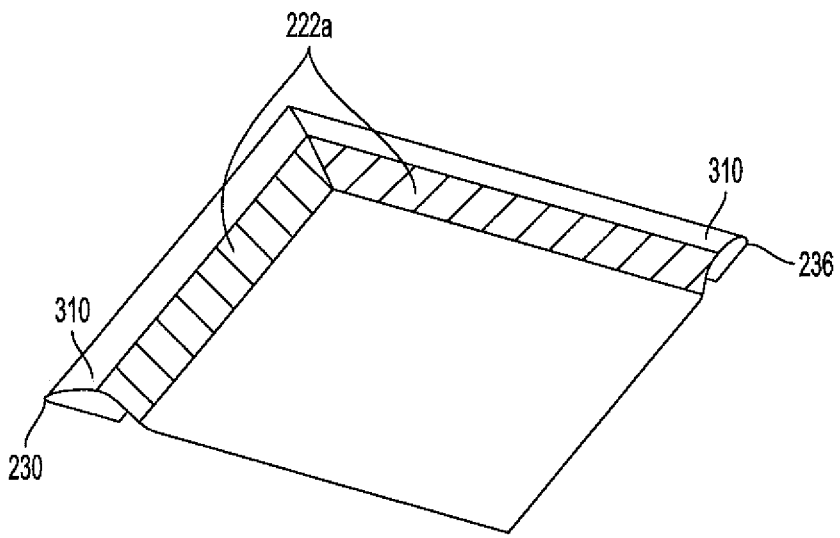

In still another embodiment as shown in FIG. 6B, the sheet 240 may have at least one other fold boundary 236 disposed similar to fold boundary 230 described herein, but located on an adjacent edge of the sheet 240. Such a configuration would similarly have two boundary areas and after folding two separate inclines on adjacent sides of the sheet 240. Such a design would inhibit a load from migrating it two orthogonal directions. It should be noted that folds of adjacent sides may need to have the corners manipulated to facilitate folding. An exemplary, but not limiting, corning technique includes shaping the ends at 45 degrees. Material variables such as thickness may necessitate corner manipulation.

Figure 6C:
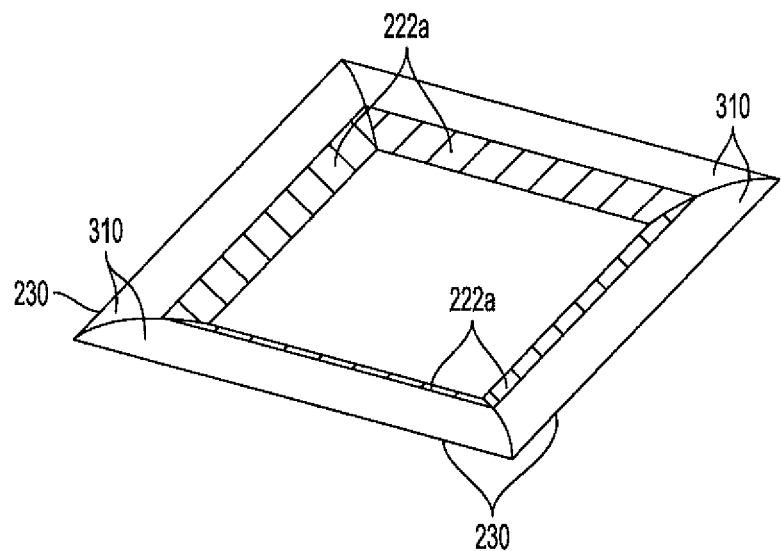

In yet another embodiment as shown in FIG. 6C, the sheet 240 may have a plurality of fold boundaries disposed similar to fold boundary 230 described herein, but located on three or more edges of the sheet 240. Such a configuration would have up to four boundary areas and after folding up to four separate inclines, one per side of the sheet 240. Such a design would inhibit a load from migrating in up to four directions. It should be noted that folds of adjacent sides may need to have the corners manipulated to facilitate folding. An exemplary, but not limiting, corning technique includes shaping the ends at 45 degrees. Material variables such as thickness may necessitate corner manipulation.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

I claim:

1. A securement mat, comprising:
a sheet of rubber having a length, a width, and a height, and including a first subsection and a second subsection, wherein an area of the second subsection is less than an area of the first subsection; and
a first fold boundary along the length or width of the sheet and proximate to one edge of the sheet defining a boundary between the first and second subsection,
wherein the first subsection exhibits a first incline by folding, along the first fold boundary, the second subsection underneath the first subsection.

2. The securement mat of claim 1, wherein the first subsection further comprises:
a main area; and
a boundary area,
wherein when the second subsection is folded underneath the first subsection, the boundary area comprises an inclined area.

3. The securement mat of claim 2, wherein the main area lies substantially flat on a surface and the slope of the inclined area is defined by a peak which rises 1-4 times the thickness of the sheet.

4. The securement mat of claim 1, wherein the first fold boundary in the sheet of rubber comprises a plurality of first slots connected by material and having a perforation ratio of individual first slots to connection material which is proportional to a tensile strength of the sheet of rubber.

5. The securement mat of claim 1, wherein the perforation ratio is 75% to 25%.

6. The securement mat of claim 1, wherein the length of the sheet is between 36-60 inches, the width of the sheet is between 24-48 inches, and the height of the sheet is between 1-5 mm.

7. The securement mat of claim 1, wherein sheet of rubber comprises granulated recycled rubber.

8. The securement mat of claim 1, further comprising a second fold boundary along the same length or width of the sheet and within the second subsection subdividing the second subsection into a third and a fourth subsection, wherein the first subsection exhibits a second incline, greater than the first incline by, prior to folding the second subsection underneath the first subsection, folding along the second fold boundary, the fourth subsection underneath the third subsection.

9. The securement mat of claim 1, wherein an additional fold boundary is located along a length or width of an opposite edge of the sheet creating a third subsection and another incline in the first subsection by folding, along the additional fold boundary, the third subsection underneath the first subsection.

10. The securement mat of claim 1, wherein an additional fold boundary is located along a length or width of an adjacent edge of the sheet creating a third subsection and another incline in the first subsection by folding, along the additional fold boundary, the third subsection underneath the first subsection.

11. The securement mat of claim 1, wherein at least two additional fold boundaries are located along a length or width of an adjacent edge and an opposite edge of the sheet creating at least a third subsection and a fourth subsection and at least two additional inclines in the first subsection by folding, along the additional fold boundaries, the at least third and fourth subsections underneath the first subsection.

12. A method for installing a securement mat comprising a sheet of granulated recycled rubber having a length, a width, and a height, and including a first fold boundary along the entire length or width of the sheet and near one edge of the sheet defining a boundary between a first subsection and a second subsection, wherein an area of the second subsection is less than an area of the first subsection, the method comprising:

folding the second subsection underneath the first subsection, along the first fold boundary to form a first incline in the first subsection at one end of the securement mat, wherein the incline inhibits a load placed on the securement mat from migrating in the direction of the incline; and positioning the securement mat over a surface of a shipping vessel with the edge including the first fold boundary between the load and a structure to be protected.

13. The method of claim 12, wherein the length of the sheet of granulated recycled rubber is between 36-60 inches, the width of the sheet is between 24-48 inches, and the height of the sheet is between 1-5 mm.

14. The method of claim 12, further comprising:

folding a fourth subsection underneath a third subsection, the third and fourth subsections formed by subdividing the second subsection along a second fold boundary within the second subsection, wherein the second fold boundary is along the same length or width of the sheet and within the second subsection, and wherein the first subsection exhibits a second incline, greater than the first incline, because of the additional fold.

15. The method of claim 12, further comprising:

folding, along an additional fold boundary, a third subsection underneath the first subsection, to form another incline in the first subsection, wherein the additional fold boundary is located along a length or width of an opposite edge of the sheet creating the third subsection.

16. The method of claim 12, further comprising:

folding, along an additional fold boundary, a third subsection underneath the first subsection, to form another incline in the first subsection, wherein the additional fold boundary is located along a length or width of an adjacent edge of the sheet creating the third subsection.

17. The method of claim 12, further comprising:

folding, along at least two additional fold boundaries, a third subsection and a fourth subsection underneath the first subsection, to form at least two additional inclines in the first subsection, wherein the at least two additional fold boundaries are located along a length or width of an adjacent edge and an opposite edge of the sheet creating the third and fourth subsections.

18. A securement mat, comprising:

a sheet of rubber having a length, a width, and a height, and including a first subsection and a second subsection, wherein an area of the second subsection is less than an area of the first subsection; and a first perforation along the length or width of the sheet and proximate to one edge of the sheet defining a boundary between the first and second subsection, wherein the first subsection exhibits a first incline by folding, along the first perforation, the second subsection underneath the first subsection.

* * * * *